INVENTOR.
HENRY B. CASE
BY
M. A. Hobbs
ATTORNEY

Feb. 19, 1963   H. B. CASE   3,078,036
COMPUTATION DEVICE
Filed June 20, 1960   5 Sheets-Sheet 3
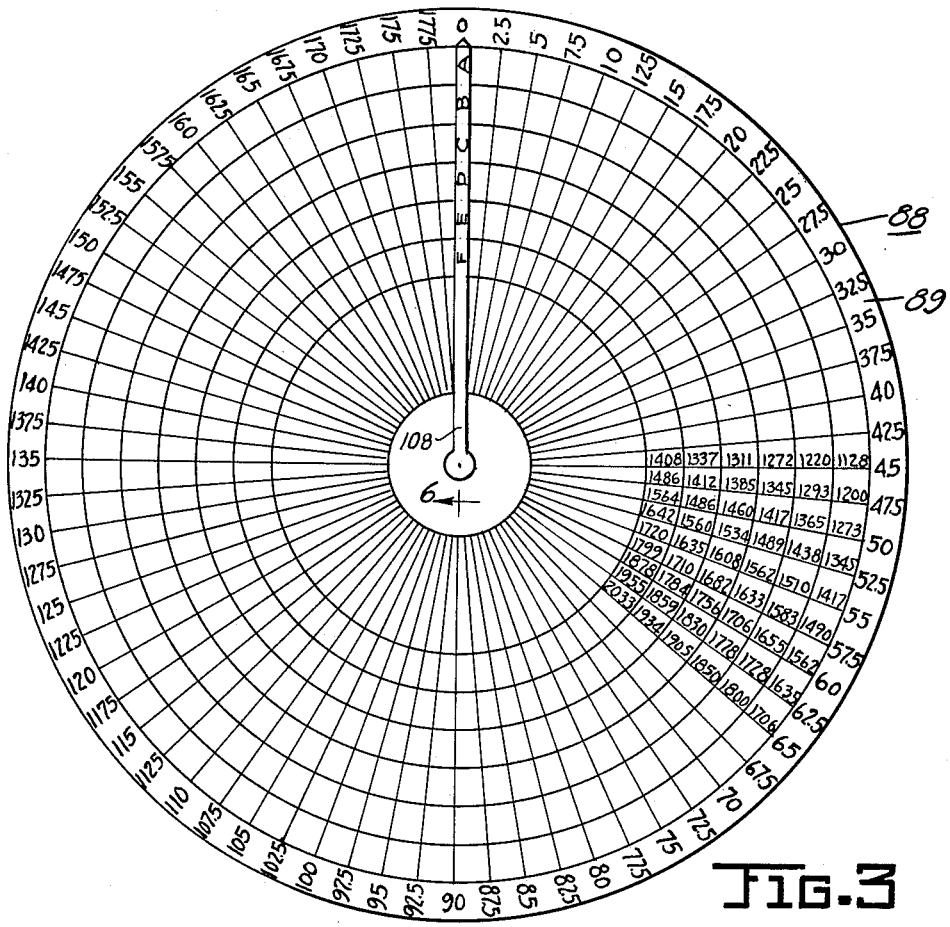
Fig.3
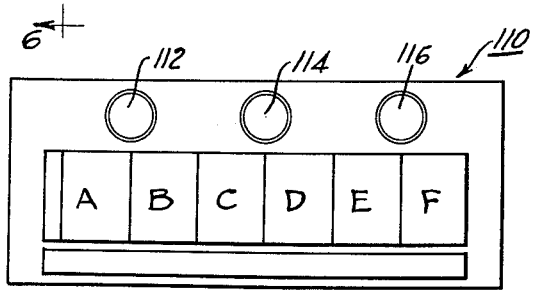
Fig.4
Fig.5
INVENTOR.
HENRY B. CASE
BY M A Hobbs
ATTORNEY Feb. 19, 1963    H. B. CASE    3,078,036
COMPUTATION DEVICE
Filed June 20, 1960    5 Sheets-Sheet 4
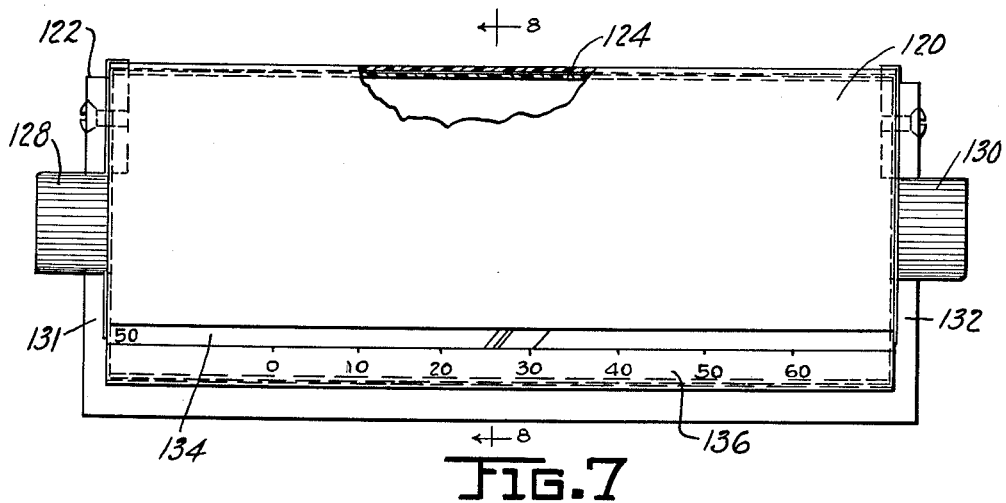
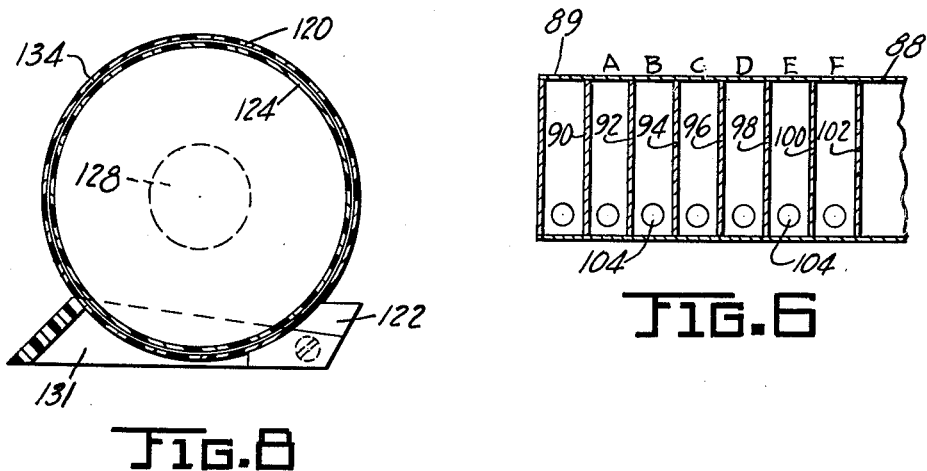
INVENTOR.
HENRY B CASE
BY
M. A. Hobbs
ATTORNEY

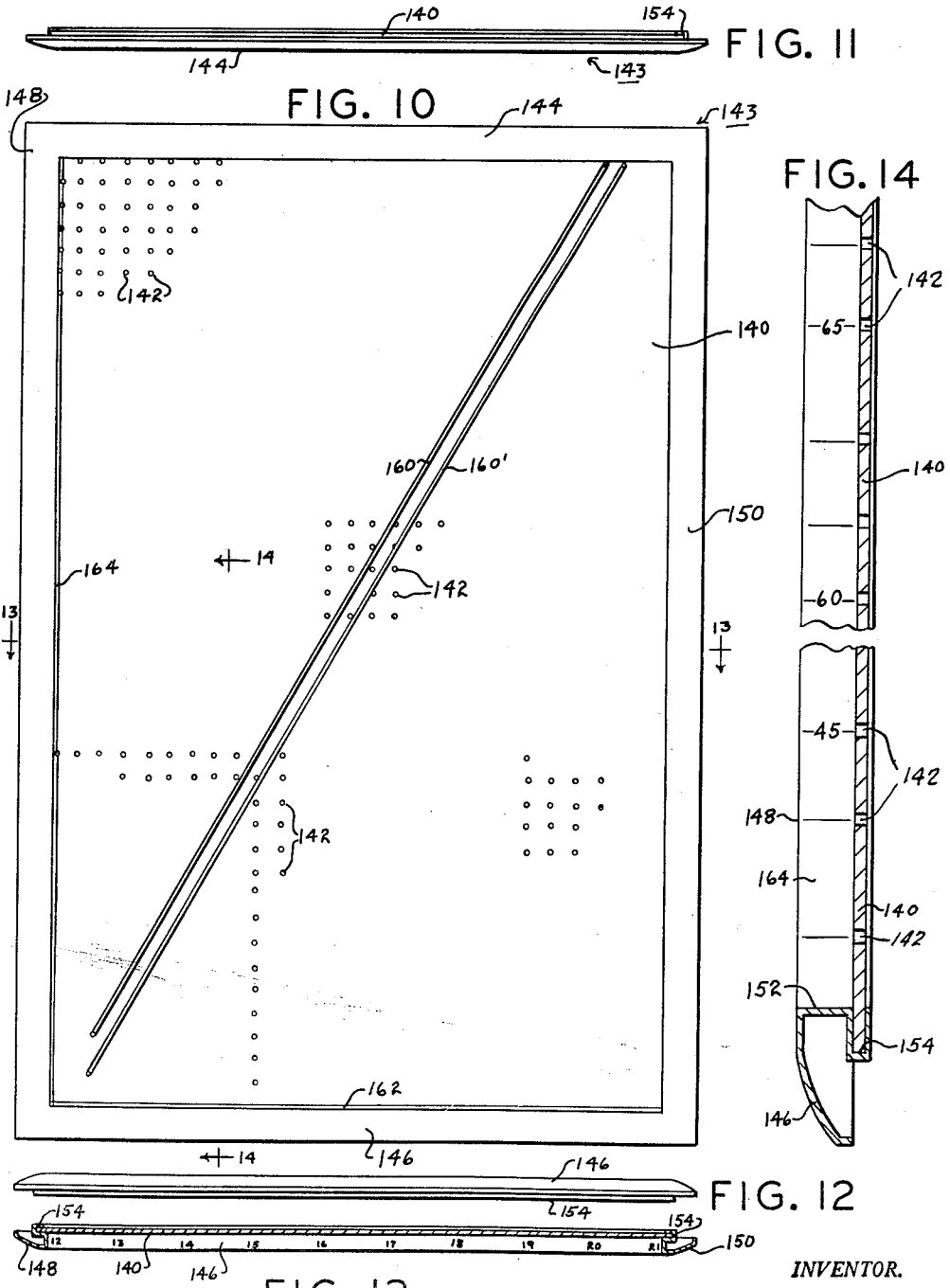

United States Patent Office 3,078,036
Patented Feb. 19, 1963

3,078,036
COMPUTATION DEVICE
Henry B. Case, 600 E. Jefferson, Plymouth, Ind.
Filed June 20, 1960, Ser. No. 37,523
3 Claims. (Cl. 235—61)

The present invention relates to a computation mechanism and more particularly to a mechanism or apparatus for determining the terms for installment buying. This application is a continuation-in-part of my application Serial No. 557,494, filed January 5, 1956, now abandoned.

In selling on the installment plan it is often important to close the transaction promptly once the customer has decided to buy, to avoid the possibility of the customer reconsidering the sale and deciding either to postpone buying or to cancel the entire transaction. In the past it has been necessary in making sales on the installment plan to make a number of time consuming computations, including separate computations of the interest on the unpaid balance, insurance premium, service and miscellaneous charges and the interest on those premiums and charges. These operations usually require considerable time on the part of both the salesman and customer and divert a substantial part of the salesman's time and effort away from his primary work of selling. It is therefore one of the principal objects of the present invention to provide a mechanism or device which a salesman and/or the customer can use to determine, in a small fraction of the time previously required, the amount of each payment to be made by a customer buying on one of a number of predevised installment plans.

Another object of the present invention is to provide a mechanism or device for computing the amount of each installment for a given unpaid balance covering a given period of time or the maximum unpaid balance possible for any given period of time and installment payment, without the user having to make any separate calculations or complicated manipulations.

Another object of the invention is to provide a mechanism or device which can be used to determine rapidly and easily without any special skill or knowledge the amount of each installment on a given unpaid balance for a given period of time or the maximum unpaid balance possible for any given period of time and installment payment.

Another object of the invention is to provide a mechanism of the aforesaid type which is compact, portable and easy to operate, and which is mechanically simple to construct and repair.

Still another object of the invention is to provide an apparatus for computing the terms of installment buying, which can be placed in a sales room, office, store, bank, finance agency and other business establishments and which can easily be serviced and readily kept up to date from time to time as installment financing conditions change.

A further object of the invention is to provide a device for computing the terms of installment buying which is of such size that it can easily be carried on the person of a salesman and from which terms of various installment plans can quickly be ascertained without the necessity for any separate calculations on the part of the salesman or customer.

Another object is to provide an apparatus for determining the terms of installment buying for one of a number of plans selected from a group, which can easily be operated by either the salesman or customer and which will indicate to the customer whether a selected plan is rated good, fair or poor with respect to the coverage and number of benefits.

Additional objects and advantages of the present invention will become apparent from the following description with reference to the accompanying drawings, wherein:

FIGURE 3 is either a top plan or vertical view of another type of apparatus or device embodying my invention;

FIGURE 4 is a control panel for use in connection with the apparatus shown in FIGURE 3;

FIGURE 5 is a chart or table for use in connection with the apparatus or device shown in FIGURE 3;

FIGURE 6 is a fragmentary cross sectional view of the apparatus shown in FIGURE 3 taken on line 6—6;

FIGURE 7 is a top plan view of another type of device embodying my invention;

FIGURE 8 is a vertical cross sectional view of the device shown in FIGURE 7 taken on line 8—8;

FIGURE 10 is a front elevational view of a further modified form of the present invention;

FIGURE 11 is a top plan view of the device shown in FIGURE 10;

FIGURE 12 is a bottom view of the device shown in FIGURES 10 and 11;

FIGURE 13 is a horizontal cross sectional view of the modified form of the invention shown in FIGURES 10, 11 and 12, taken on line 13—13 of FIGURE 10; and FIGURE 14 is an enlarged fragmentary view of the device taken on line 14—14 of FIGURE 10.

Figure 1:
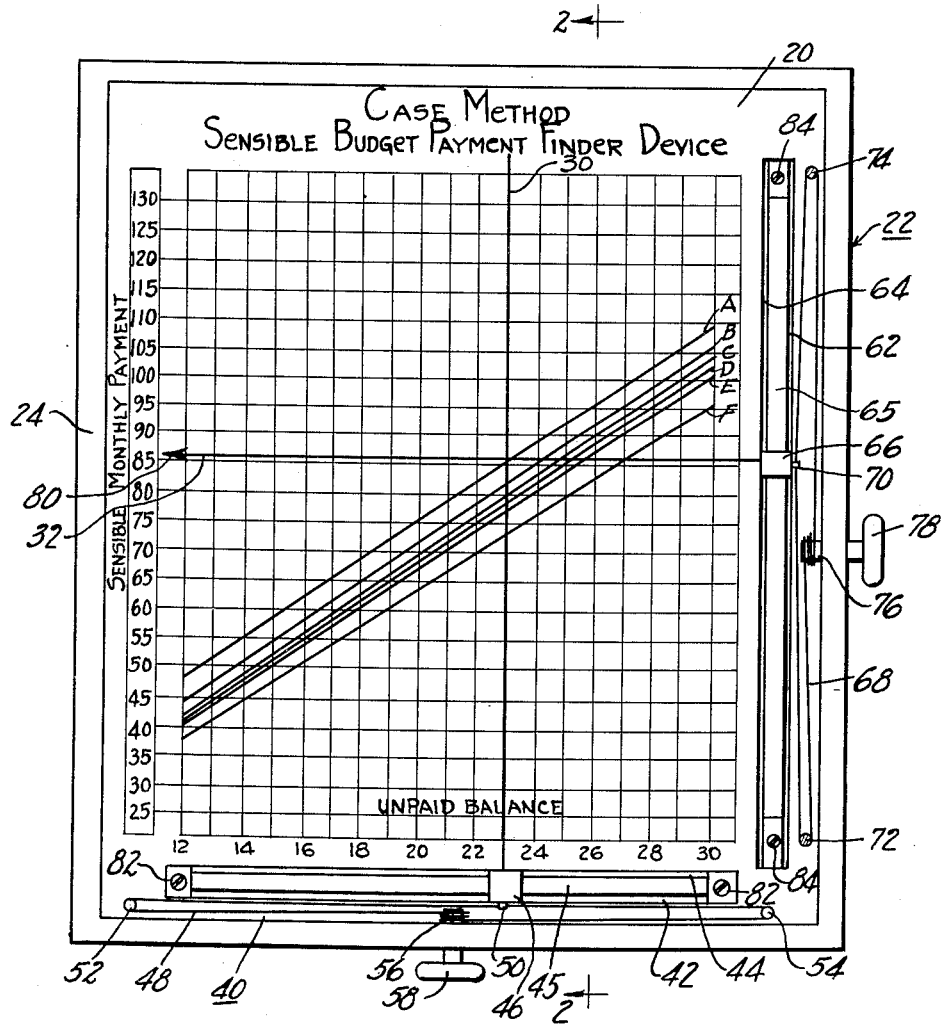
FIGURE 1 is a top plan view of one form of an apparatus embodying my invention.
Figure 2:
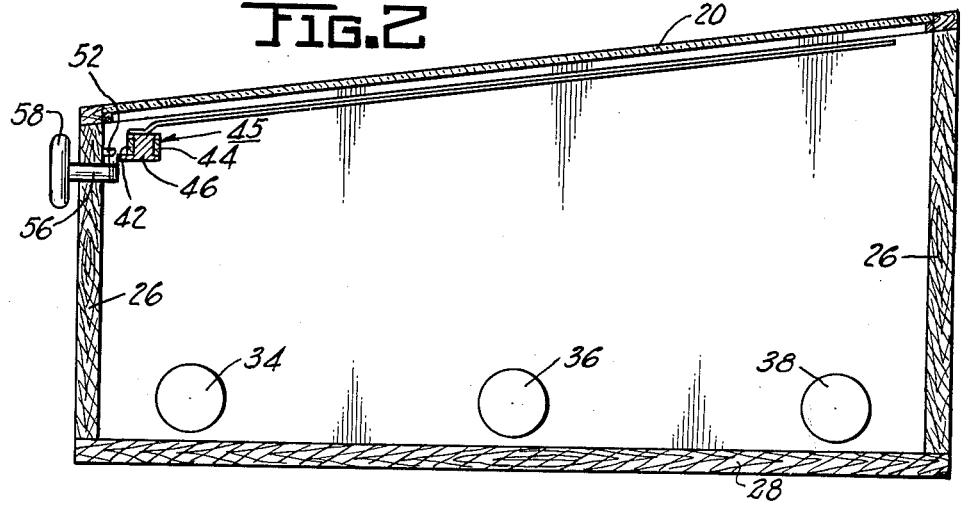
FIGURE 2 is a vertical cross sectional view of the apparatus shown in FIGURE 1 taken on line 2—2.

The graph shown on the apparatus of FIGURE 1 is basically the same as the one disclosed and claimed in my copending application Serial No. 554,086, now abandoned, and the manner in which it is used for computing the terms of installment buying is also basically substantially the same as described in said earlier application.

For the purpose of the present description the use of the graph will be illustrated with reference to the sale of new automobiles on the installment plan. In this regard, the graph shown is based on a thirty-six month payment period in which the unpaid balance is to be paid off in thirty-six equal installments. The amount of the unpaid balance of the purchase price is indicated along the abscissa of the graph and covers a range from $1,200.00 to $3,000.00, in which most unpaid balances fall for new automobile purchases made on a thirty-six month payment plan. This range, however, can readily be extended in both directions by merely enlarging the graph. The figures along the abscissa as applied to automotive sales represent hundreds of dollars, and the distance between each vertical line represents one hundred dollars. The amount of each payment under a particular payment plan is indicated along the ordinate of the graph and covers a range from $25.00 to $130.00, in which most monthly payments fall for purchases made on a thirty-six month payment plan. This range, like the unpaid balance range, can also be extended in either direction if desired, by merely enlarging the graph.

The diagonal lines A, B, C, D, E and F on the graph represent the various plans of installment buying available to a customer, the plans decreasing in benefits from plan A to plan F. In closing a sale it is usually more advantageous to the salesman from the standpoint of the amount of profit and/or commission made on the sale to induce the customer to select the plan having the greatest number of benefits and advantages to the customer, such as plan A. If the customer is unable to afford plan A, plan B would next be considered and thence to each succeeding plan C, D, E or F, until a plan financially satisfactory to the customer is found. In the present description the plans containing the fewest benefits will first be described.

Plan F includes only the unpaid balance and the interest on the unpaid balance (for example five percent) distributed into thirty-six equal payments. In determining the position of line F on the graph, the unpaid balance of $1,200 and the amount of interest for thirty-six months are totaled and this total is divided by thirty-six which corresponds to the number of equal monthly payments. The results of this computation is located on the vertical line above numeral 12 on the graph. The unpaid balance of $3,000 and the amount of interest for thirty-six months on this balance are totaled and this total is also divided by thirty-six and the results located on the vertical line above numeral 30. When the point located on the vertical line above numeral 12 and the point located on the vertical line above numeral 30 are connected to form line F, the line accurately indicates the amount of each of the thirty-six monthly payments for any given unpaid balance between $1,200 and $3,000, together with the interest for the thirty-six month period on the unpaid balance.

Plan E is substantially the same as plan F except a higher rate of interest, as for example seven percent, is applied to the unpaid balance. With this plan a lower down-payment is required than plan F. The low and high points on the graph for line E are determined in the same manner as they were in locating those points for line F, as explained above.

Plan D includes, in addition to the items of plan E, a charge covering a repair service known as car life. This is a fixed charge and, together with the interest thereon for thirty-six months, is added to the unpaid balance and the interest on the unpaid balance, and this total is divided by thirty-six to give the amount of the monthly installment payments. The low and high points on the graph for line D are determined by using the same procedure as that explained for lines E and F, and those points are connected to give line D.

Plan C contains all the benefits of plan D and in addition includes a charge for term insurance covering the unpaid balance, known as credit life. This charge is based on a percentage of the unpaid balance, as for example three percent, and is added to the items included in the computation of the payments of plan D. This total is then divided by thirty-six to give the amount of the monthly installments for the plan. Line C is plotted in the same manner as the lines previously described, i.e. the low and high points are determined and those points connected by a straight line.

Plan B contains all the benefits of plan C and in addition includes a charge for a one year standard automobile insurance policy plus interest. Since insurance premiums vary considerably from one locale to another, the correct amount for the insurance cannot be included in the computation for determining the line B unless a separate graph is produced for each locale and for each new automobile classification. In order to standardize the graphs so that they will have wide application throughout the country, a basic premium is included in the computation for line B and the small correction figure taken from a variance table is added to the monthly installment figure. The basic premium is preferably slightly lower than the minimum premium payable anywhere in the country so that the variance figure will always be added to rather than subtracted from the monthly installment figure. In plotting line B the basic premium for one year of insurance, together with the interest thereon for one year, is added to the items included in the computation of the payments of plan C and the low and high points for line B are found and those points connected by a straight line.

Plan A is the same as plan B with the exception that the insurance policy covers a three year period. The procedure for plotting line A is the same as that explained for plan B and the amount of the monthly installment figure must be corrected with the correction figure from the variance table, as previously explained. The following is an example of a variance table suitable for use with my graph in one particular locale:

*Amount To Be Added to Monthly Payment*

| Class 1 | | Car Classification | Class 2 | |
|---|---|---|---|---|
| A | B | | A | B |
| $0.00 | $0.00 | H | $1.82 | $0.80 |
| 0.44 | 0.33 | I | 2.45 | 1.04 |
| 0.98 | 0.53 | J | 3.19 | 1.30 |
| 1.65 | 0.77 | { K L } | 4.07 | 1.60 |
| 1.98 | 0.90 | M | 4.40 | 1.75 |

The H to M car classification covers the range from small cars to large cars. The classes refer to the insurance and the A designation to a three year period of insurance and the B to a one year period. The figures given for the insurance figures are determined by taking the difference between the basic premium and the actual premium for a particular locale and dividing that difference by thirty-six.

While the graph shown in the drawing covers a thirty-six month period, graphs embodying the same basic characteristics can be made for any time payment period, such as twelve, eighteen, twenty-four and thirty months. This modification is made by merely using the foregoing figures in the computation previously described in place of thirty-six. The graph can also be constructed with diagonal lines representing more than one time payment period, for example twelve, twenty-four and thirty month periods.

The graph is mounted on a glass plate 20 which forms the top panel of a cabinet 22 consisting of a frame 24 for supporting the glass, ends 26 and bottom 28. While the cabinet is shown as being constructed of wood, sheet metal or any other suitable material may be used in the place of wood. The graph is preferably a translucent or transparent decal secured to the underside of glass 20 and the lines of the graph and the lines representing the various installment plans A to F, together with the numbers and letters are either lighter or darker than the background of the graph. To assist in accurately locating the correct monthly installment payments along the ordinate, two mechanically operated hands 30 and 32 are provided, hand 30 lying parallel to the vertical lines of the graph and moving horizontally and hand 32 lying parallel to the horizontal lines of the graph and moving vertically. Both hands are disposed immediately below the underside of glass 20 and are adapted to cast a shadow on the glass when the graph is lighted by a plurality of lights, preferably fluorescent, 34, 36 and 38 mounted on suitable fixtures in the lower part of the cabinet. Hand 30 is moved horizontally under the glass by a mechanism 40 consisting of a pair of bars 42 and 44 forming a track 45 on which a carriage 46 is adapted to slide. The carriage is moved along the track by cable 48 attached to the carriage by a pin 50 and threaded over pulleys 52 and 54 at opposite ends of the track and thence wound around a rotatable shaft 56 extending through the side of the cabinet and adapted to be rotated by a knob 58 secured to the end of the shaft. As the shaft is rotated by the knob, the cable, on the right hand side, for example, winds onto the shaft and the cable on the left hand side unwinds from the shaft, thus causing carriage 46 to move toward the right as shown in FIGURE 1.

Hand 32 is moved by a mechanism similar to that described for hand 30, consisting of a pair of bars 62 and 64 forming a track 65 on which a carriage 66 is slidably mounted. The carriage is moved along the track by a cable 68 attached to the carriage by a pin 70 and threaded over pulleys 72 and 74 at opposite ends of the track and around a rotatable shaft 76 extending through the side of the cabinet and adapted to be rotated by a knob 78 secured to the outside end of the shaft. When the shaft is rotated in a counter-clockwise direction by the knob, the cable above the shaft winds onto the shaft and the cable below the shaft unwinds therefrom, causing the carriage 66 to slide upwardly along track 65. An arrow point 80 is provided on the free end of hand 32 to facilitate accurate location of the proper monthly payment in the ordinate.

The decal for the graph would normally conceal tracks 45 and 65 which are disposed under the glass but for the purpose of the present description that portion of the decal above the tracks has been removed in order to clearly show the construction of the mechanism for operating the hands. Suitable brackets (not shown) for rigidly supporting the tracks are secured to screws 82 and 84 at each end of tracks 45 and 65, respectively, and are mounted on and supported by the adjacent side wall of the cabinet.

The operation of the apparatus shown in FIGURE 1 is as follows: if the unpaid balance on the sale of an automobile is $2,300, hand 30 is moved by rotating knob 58 in the direction to place hand 30 directly under the point on the graph representing that particular balance. When lights 34, 36 and 38 are on, hand 30 casts a well defined shadow line on the decal graph. Then hand 32 is moved by rotating knob 78 in the direction to place the hand exactly under the point where hand 30 intersects the line on the graph representing the selected installment plan. With hand 32 in that position arrow point 80 indicates the amount of the monthly payment, which in this example would be $86.00 for selected plan A.

The modification of the computer shown in FIGURES 3 to 6, inclusive, has a front panel or face 88 in the form of a compass rose divided into a series of rings A to F representing the various installment buying plans available to the customer. These rings are encircled by an outer ring 89 bearing the correct installment payment for the unpaid balance appearing along the respective radiating lines for any particular installment plan. Only a representative section of the face has been filled in with the figures for the unpaid balance. A complete unit would have figures in most of the sections around the entire face. As used on the apparatus of this modification, face 88 consists of translucent or trasnparent plastic or glass on which the lines and figures are placed by the use of a decal or by printing or molding. As an alternative a thin paper chart supported by the plastic or glass panel can be used. This latter arrangement has the advantage of permitting the chart to be readily changed at little cost whenever there is a change in installment financing conditions. The rings are adapted to be individually lighted so that when a customer selects a particular plan the ring representing the selected plan will light up causing the figures on said ring to stand out and be clearly visible. To obtain the individual lighting effect for the various rings, a series of annular walls or partitions 90, 92, 94, 96, 98, 100 and 102 are placed under face 88 directly beneath the annular lines defining the rings, as shown in FIGURE 6. Individual series of lights 104 are placed in each annular compartment formed by the partitions. To assist in finding the correct figures a hand 108 pivoted at the center of the face either above or below the plastic or glass is provided. The designations for the various plans can be placed on the hand as shown in FIGURE 3. If the hand is under the glass a small space must be provided between the edge of the partition and the glass, and the hand would be operated by a knob on the front of the face.

The lights for any particular compartment are controlled by panel 110, shown in FIGURE 4, which is provided with buttons A to F corresponding to the rings on the face of the apparatus and controlling switches for circuits of the respective lights 104. Also controlled by the buttons are green, amber and red lights 112, 114 and 116 respectively. These lights indicate to the customer the rating or relative value of the plan selected by him. As previously explained herein, plans A and B include the greatest benefits and coverage; therefore, when the salesman or customer punches buttons A or B, green light 112 lights up, indicating to the customer that the plan is rated good. Plans C and D offer only moderate or mediocre coverage and relatively few benefits; hence when buttons C or D are punched, the amber light 114 lights up, indicating that the plan is rated only fair. Plans E and F offer no benefits or coverage and when buttons E or F are punched, the red light 116 lights up, indicating that the plan is rated poor and reconsideration should be given by the customer to the plan selected. FIGURE 5 shows an insurance variance chart similar to the one shown and described herein, which may be included on or near the face of the apparatus for the convenience of the salesman.

In the operation of the apparatus just described, the salesman or customer punches the button representing the desired plan, for example A. This causes green light 112 and the lights in the compartment under ring A of face 88 to light up. The figure representing the amount of the unpaid balance, for example $1,200, is located and the amount of the installment payment for that unpaid balance is read from the outer ring at the end of the corresponding radiating line, which in the present example would be $47.50. Hand 108 can be used to assist in locating the figures if desired. Its use becomes more important when figures on the rings nearer the center are involve in the determination of the installment payment.

The face of the apparatus shown in FIGURE 3 can be adapted to a card, disc or the like and used as a separate device or chart, without making any changes in the basic character thereof. It can be reduced to a size suitable for a pocket instrument or it can be sufficiently large to be used as a desk or wall instrument. It can be used with or without a hand similar to hand 108 and can be constructed of plastic, heavy paper or metal. The reverse side of the instrument may contain a similar chart for a different time payment period or the reverse side may be used for advertisement or notations recording a particular sales transaction. In the latter case a separate instrument would be used for each sale.

Figure 9:
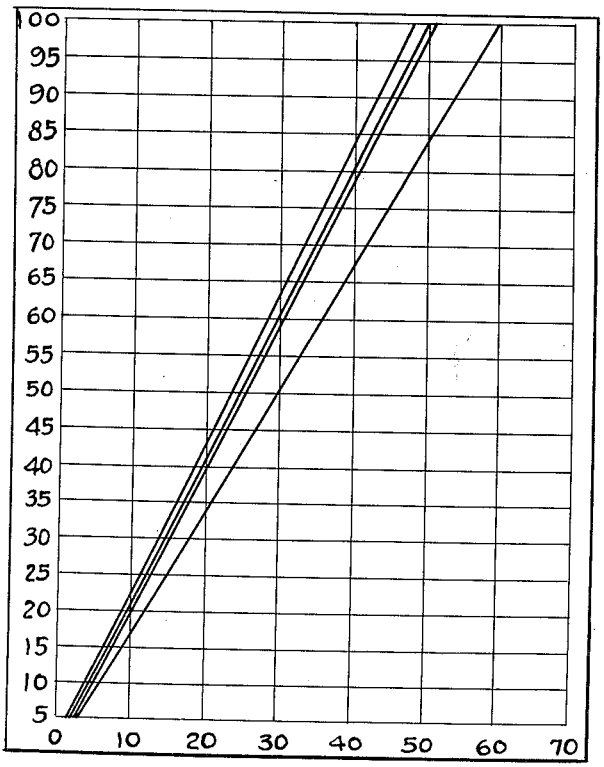
FIGURE 9 is a plan view of a graph adapted to be used with the device shown in FIGURES 7 and 8.

The modification of the present invention shown in FIGURES 7, 8, and 9, is a computing device consisting of a sleeve 120 mounted on a base 122 and a rotatable cylinder 124 mounted in the sleeve and having knobs 128 and 130 secured to the ends thereof for rotating the cylinder in the sleeve. The cylinder is prevented from moving endwise in the sleeve when the device is in use by members 131 and 132 which constitute a part of the base and which can be moved to permit removal of the cylinder from the sleeve. Wrapped around the cylinder is a sheet of paper or the like containing a graph in the nature of the one shown in FIGURE 9, wherein the figures along the abscissa represent the installment payments and the figures along the ordinate represent the amount of the unpaid balance of the purchase. The diagonal lines represent the various installment plans, such as those described previously herein, ranging from plan A on the right to plan D on the left. When the graph is wrapped around cylinder 124, the top edge of the graph just meets the bottom edge below the figures. The sleeve is opaque and is provided with a longitudinal slot 134 through which the operator can see a segment of the lines representing the installment plans. Mounted either immediately above or below the slot on the sleeve is a scale 136 corresponding exactly to that shown on the abscissa of the graph.

In the operation of the device just described, the salesman or customer rotates cylinder 124 by using knobs 128 and 130 until the figure representing the unpaid balance appears in the center of the slot on the left hand side thereon. The operator then merely reads the figure representing the amount of each installment payment for a selected plan from scale 136 at the side of the slot. For example, if the amount of the unpaid balance is $500.00 on an appliance or furniture sale, the cylinder is rotated until this figure appears in the slot at the left. The correct amount for the installment payment is then read from the scale along the slot, it being in this instance $30.00 for a payment period of 18 months. If and when installment financing conditions change sufficiently to warrant installing a new graph, cylinder 124 is merely slipped endwise from the sleeve after being released by members 131 and 132, the new graph mounted on the cylinder, and the cylinder reinserted in the sleeve and locked in place by said members.

The further modified form of the present invention illustrated in FIGURES 10 through 14 consists of a panel 140 having a series of lines defined by holes 142 extending throughout the panel and forming a configuration of equally spaced horizontal and vertical intersecting lines, only a portion of the holes being shown in the figure, in that the holes are merely duplications. The panel is enclosed around the edges by a frame 143 having top and bottom members 144 and 146 and left and right side members 148 and 150, respectively. Each frame member 146, 148 and 150 shown in the drawings consists of a metal channel-like member having an inner edge 152 perpendicular to the surface of panel 140 and a U-shaped inwardly facing channel 154 at the rear. The channels 154 form an inner frame for supporting panel 140. Since the U-shaped member 154 is not included on frame member 144, the panel can be readily slipped into the slot from the top after the frame members have been assembled and joined rigidly together at the corners.

One or more diagonal bars or strips 160 and 160' are secured to the face of panel 140, and correspond to lines A, B, C, D, E and/or F on the graph representing the various plans of installment buying available to a customer, as previously described herein. As requirements for installment buying vary from time to time, these strips can be changed or the panel 140 containing the various strips can be replaced by other panels having a different set of strips. The strips may be of wood, metal, plastic, tape or paint and may be secured to the panel by any suitable securing means.

One of the important features of the present invention is the position of edge 152 relative to the surface of the panel on two adjacent frame members. The outwardly projecting edge provides a surface for scales representing the unpaid balance and periodic installment payments, on bottom member 146 and left hand vertical member 148. As shown, edge 152 of bottom member 146 contains the scale for the unpaid balance and the edge 152 of side member 148 contains the scale for the installment payments. This arrangement of the surfaces makes it possible to readily determine the payments from a given unpaid balance and to read the amounts accurately on the respective edges 152. The scales can be placed on tapes 162 and 164 or other easily removable strips of material, and secured to the edges 152 with cement or other suitable tacky material. These strips can be removed and replaced from time to time to meet changing installment buying requirements.

This type of computing device can be made in various sizes from a small unit usable on a deck to a large unit adapted to be hung on the wall and seen from various points in the room. It is only necessary that the user be able to read the numerals on the edges 152 of members 146 and 148 or on the tape secured thereto. This permits the salesman to determine immediately, at least approximately, the amount of each monthly installment from a given unpaid balance by a mere glance while he is discussing the arrangements with a customer.

While the materials from which the device shown in FIGURES 10 through 14 are constructed are not important, the device illustrated consists of aluminum framing and a perforated pressed fiber board panel with a metal strip 160. A panel having metal buttons in place of holes 142 may be used if desired, and a wood or plastic frame can be used in place of the aluminum frame. Another advantage of the device when it is used as a wall unit consists of the available space in the upper left and lower right portions of the panel shown, for bulletins, announcements, and advertising material.

While the applicant has shown a number of modified forms of the present invention herein, various changes may be made in the devices to suit the requirements.

I claim:

1. A device for use in determining the terms of installment financing, comprising a rectangular panel having a plurality of holes equally spaced from one another and forming a configuration of equally spaced horizontal and vertical intersecting guide lines, four members forming a frame around said panel and having the inner edges extending perpendicularly outwardly from the front face of said panel, the inner edge of one of said members having a scale graduated in accordance with the spacing of said holes and representing the unpaid balance of a sale and the inner edge of an adjacent member having a scale graduated in accordance with the spacing of said holes and representing periodic installment payments, and a strip representing an installment plan secured to said panel and extending diagonally on the face of said panel with respect to the members containing said scales and to said horizontal and vertical intersecting guide lines.

2. The device defined in claim 1 wherein a second strip substantially parallel to said strip is mounted on the face of said panel.

3. The device defined in claim 1 wherein said strip is a metal member secured to said panel.

References Cited in the file of this patent

UNITED STATES PATENTS

| 1,780,036 | Padgett | Oct. 28, 1930 |
| 2,070,431 | Hoppmann | Feb. 9, 1937 |
| 2,296,799 | Rosin | Sept. 22, 1942 |
| 2,309,675 | Schlomann | Feb. 2, 1943 |
| 2,905,138 | Nicolaus | Sept. 22, 1959 |
| 2,939,421 | Durnin | June 7, 1960 |

FOREIGN PATENTS

| 17,334 | Great Britain | July 22, 1909 |